(12) United States Patent
Harandi et al.

(10) Patent No.: US 12,404,463 B2
(45) Date of Patent: Sep. 2, 2025

(54) PROCESS AND SYSTEM FOR PROCESSING ASPHALTENES-RICH FEED

(71) Applicant: ExxonMobil Chemical Patents Inc., Baytown, TX (US)

(72) Inventors: Mohsen N. Harandi, New Hope, PA (US); Paul F. Keusenkothen, Houston, TX (US)

(73) Assignee: ExxonMobil Engineering & Technology Company, Baytown, TX (US)

( * ) Notice: Subject to any disclaimer, the term of this patent is extended or adjusted under 35 U.S.C. 154(b) by 94 days.

(21) Appl. No.: 17/421,530

(22) PCT Filed: Jan. 17, 2020

(86) PCT No.: PCT/US2020/013974
§ 371 (c)(1),
(2) Date: Jul. 8, 2021

(87) PCT Pub. No.: WO2020/159719
PCT Pub. Date: Aug. 6, 2020

(65) Prior Publication Data
US 2022/0098495 A1 Mar. 31, 2022

Related U.S. Application Data

(60) Provisional application No. 62/798,662, filed on Jan. 30, 2019.

(30) Foreign Application Priority Data

Apr. 18, 2019 (EP) ..................................... 19170296

(51) Int. Cl.
*C10G 55/00* (2006.01)
*B01D 3/14* (2006.01)
(Continued)

(52) U.S. Cl.
CPC ............... *C10G 55/04* (2013.01); *B01D 3/14* (2013.01); *B01D 3/38* (2013.01); *B01J 6/008* (2013.01);
(Continued)

(58) Field of Classification Search
CPC ... B01D 3/38; B01D 3/143; B01D 3/14; B01J 6/008; C10C 3/007; C10G 9/00;
(Continued)

(56) References Cited

U.S. PATENT DOCUMENTS 3,240,695 A    3/1966 Porter et al.
3,617,493 A *  11/1971 Wirth ..................... C10G 51/06
                                                     208/92

(Continued)

FOREIGN PATENT DOCUMENTS

GB           2012176        7/1979

*Primary Examiner* — Prem C Singh
*Assistant Examiner* — Brandi M Doyle (57) ABSTRACT

Disclosed are process and system for making an asphalt product and an olefin product from an asphaltenes-rich feed without using a vacuum distillation column. The feed is first deep stripped in a first stripping column using a stripping vapor such as steam and/or a C2-C3 paraffins-rich stream to obtain a bottoms liquid effluent having a high cutpoint and an overheads effluent comprising gas oil, lighter hydrocarbons, and the stripping vapor. The high-boiling point bottoms liquids effluent, with optional additional separation and/or treatment, can be used as asphalt products. The overheads effluent, with optional additional separation, can be fed into a pyrolysis furnace cracker, where it is converted into a cracker product mixture comprising olefins, lighter hydrocarbons, hydrogen, and the like, which can be recovered in a products recovery subsystem.

24 Claims, 5 Drawing Sheets

(51) Int. Cl.
  *B01D 3/38* (2006.01)
  *B01J 6/00* (2006.01)
  *C10C 3/00* (2006.01)
  *C10G 55/04* (2006.01)

(52) U.S. Cl.
  CPC ........ *C10C 3/007* (2013.01); *C10G 2300/206* (2013.01); *C10G 2300/4006* (2013.01); *C10G 2300/4012* (2013.01); *C10G 2400/20* (2013.01); *C10G 2400/22* (2013.01)

(58) Field of Classification Search
  CPC . C10G 9/36; C10G 7/00; C10G 55/04; C10G 2400/22; C10G 2400/20; C10G 2300/206; C10G 2300/4006; C10G 2300/4012
  See application file for complete search history.

(56) References Cited

U.S. PATENT DOCUMENTS

| | | | | |
|---|---|---|---|---|
| 5,228,977 | A * | 7/1993 | Moran | C10C 3/026 208/4 |
| 7,247,765 | B2 * | 7/2007 | Stell | C10G 9/00 208/130 |
| 2005/0261531 | A1 | 11/2005 | Stell et al. | |
| 2006/0129012 | A1 * | 6/2006 | Frye | B01D 3/4294 585/650 |
| 2007/0232846 | A1 | 10/2007 | Baumgartner et al. | |
| 2018/0142166 | A1 * | 5/2018 | Al-Ghamdi | B01D 3/14 |

* cited by examiner

PROCESS AND SYSTEM FOR PROCESSING ASPHALTENES-RICH FEED

CROSS-REFERENCE TO RELATED APPLICATIONS

This application is a US national phase application of PCT Application Serial No. PCT/US2020/013974 having a filing date of Jan. 17, 2020, which claims priority to and the benefit of U.S. Provisional Application No. 62/798,662 having a filing date of Jan. 30, 2019 and European Patent Application No. 19170296.8 having a filing date of Apr. 18, 2019, the disclosures of all of which are incorporated herein by reference in their entireties.

FIELD OF THE DISCLOSURE

This disclosure relates to processes and systems for processing petroleum feeds. In particular, this disclosure relates to processes and systems for processing petroleum feeds such as crude oil and/or fraction thereof rich in asphaltenes suitable for making asphalt products. This disclosure is useful, e.g., for producing asphalt, olefins, gasoline, diesel, and/or other fluids from asphaltenes-rich petroleum feeds.

BACKGROUND OF THE DISCLOSURE

Asphalt is a sticky, typically black, high-viscosity liquid or semi-solid that is present in most petroleum crude oils. Asphalt is rich in certain petroleum crude oils produced from certain locations in the world. Asphalt can be used as a binder and/or water-proof component in, among others, road pavements, roofing and pipe coating and sealing applications. According to the requirements of the end use, asphalt is produced to various specifications with differing requirements for flash points, hardness, viscosity at handling temperature, dynamic shear, mass loss, creep stiffness at low temperature, and the like. It is estimated that current total use of asphalt worldwide is well above 100 million tons per annum. A great majority of the asphalt produced is used as the binder in asphalt concrete for road pavement. It is also used in other paved areas such as airport runways, vehicle parking lots, and pedestrian walking paths. Typically, in making asphalt concrete, particulate matters such as gravels, sand, and the like, are mixed with asphalt serving as a binder.

Asphalt is typically produced from petroleum crude oil rich in asphaltenes suitable for asphalt products. Because the asphaltenes suitable for asphalt tend to have very high boiling points, asphalt production from petroleum crude oil historically typically requires vacuum distillation of certain fraction of the petroleum crude oil, which is less than desirable due to potential air ingress into the column. Moreover, when making asphalt products from a petroleum crude oil feed, it is also highly desirable to be able to produce other valuable hydrocarbon products, such as olefins, gas oils, distillates, and fuel oils, particularly olefins which can be of high economic value.

Thus, there is a need for processes and systems for processing petroleum crude oils under mild conditions to produce asphalt products and other hydrocarbon products. This disclosure satisfies this and other needs.

SUMMARY

It has been found that by deep stripping an asphaltenes-rich feed, such as heavy crude rich in asphaltenes, using a stripping vapor such as steam, light hydrocarbons, and the like, in a stripping column, one can obtain a bottoms liquid effluent with a high cutpoint of higher than 400° C. and an overhead vapor effluent comprising vacuum gas oil, lighter hydrocarbons and the stripping vapor. The bottoms liquid effluent, or a portion thereof after optional further stripping and additional treatment, can be used as an asphalt product. The overhead effluent, or a portion thereof after optional further separation, can be fed into a pyrolysis furnace cracker, where it is converted into olefins, lower hydrocarbons, hydrogen, and the like, which can be recovered in a downstream recovery subsystem. This stripping column—pyrolysis furnace cracker system can be advantagedly used to produce asphalt products, olefins, and cracker byproducts, without the need of using a vacuum distillation column. Furthermore, because the first upper effluent or the portion fed into the pyrolysis furnace cracker are free of heavy hydrocarbons present in the bottoms effluent which are prone to fouling the cracker, the pyrolysis furnace reactor can be operated with less downtime due to fouling.

Thus, a first aspect of this disclosure relates to A process for producing an asphalt product and an olefin product from an asphaltenes-rich feed, the process comprising: (I) feeding the asphaltenes-rich feed to a first stripping column through a first inlet on the first stripping column; (II) feeding a first stripping vapor stream to the first stripping column through a second inlet on the first stripping column, the second inlet being located below the first inlet; (III) obtaining a first overhead effluent from the first stripping column; (IV) feeding at least a portion of the first overhead effluent to a pyrolysis furnace cracker operating under pyrolysis cracking conditions; (V) obtaining a cracker product mixture effluent from the pyrolysis furnace cracker; (VI) obtaining an olefin product and at least one cracker byproduct stream from the cracker product mixture effluent in a cracked product recovery zone; (VII) obtaining a first bottoms effluent from the first stripping column rich in asphaltenes; and (VIII) obtaining the asphalt product from the bottoms effluent.

A second aspect of this disclosure relates to a system for processing an asphaltenes-rich feed to produce asphalt and lighter hydrocarbons, comprising: (A) a first stripping column comprising a first inlet for receiving the asphaltenes-rich feed, a second inlet located below the first inlet for receiving a first stripping vapor stream, a first outlet in the vicinity of the bottom of the first stripping column for discharging a first bottoms effluent rich in asphaltenes suitable for making asphalt products, and a second outlet in the vicinity of the top of the first stripping column for discharging a first overhead effluent comprising a first stripping vapor and hydrocarbons; (B) a pyrolysis furnace cracker in fluid communication with the first stripping column for receiving the first overhead effluent from the first stripping column, capable of operating under pyrolysis cracking conditions to convert at least a portion of the hydrocarbons in the first overhead effluent into lighter hydrocarbons to produce a cracker product mixture effluent; and (C) a product recovery subsystem in fluid communication with the pyrolysis furnace cracker for receiving the cracker product mixture effluent capable of separating the cracker product mixture effluent to produce an olefin product.

DETAILED DESCRIPTION

Various specific embodiments, versions and examples of the invention will now be described, including preferred embodiments and definitions that are adopted herein for purposes of understanding the claimed invention. While the following detailed description gives specific preferred embodiments, those skilled in the art will appreciate that these embodiments are exemplary only, and that the invention may be practiced in other ways. For purposes of determining infringement, the scope of the invention will refer to any one or more of the appended claims, including their equivalents, and elements or limitations that are equivalent to those that are recited. Any reference to the "invention" may refer to one or more, but not necessarily all, of the inventions defined by the claims.

In this disclosure, a process is described as comprising at least one "step." It should be understood that each step is an action or operation that may be carried out once or multiple times in the process, in a continuous or discontinuous fashion. Unless specified to the contrary or the context clearly indicates otherwise, multiple steps in a process may be conducted sequentially in the order as they are listed, with or without overlapping with one or more other step, or in any other order, as the case may be. In addition, one or more or even all steps may be conducted simultaneously with regard to the same or different batch of material. For example, in a continuous process, while a first step in a process is being conducted with respect to a raw material just fed into the beginning of the process, a second step may be carried out simultaneously with respect to an intermediate material resulting from treating the raw materials fed into the process at an earlier time in the first step. Preferably, the steps are conducted in the order described.

Unless otherwise indicated, all numbers indicating quantities in this disclosure are to be understood as being modified by the term "about" in all instances. It should also be understood that the precise numerical values used in the specification and claims constitute specific embodiments. Efforts have been made to ensure the accuracy of the data in the examples. However, it should be understood that any measured data inherently contain a certain level of error due to the limitation of the technique and equipment used for making the measurement.

As used herein, the indefinite article "a" or "an" shall mean "at least one" unless specified to the contrary or the context clearly indicates otherwise. Thus, embodiments using "a fractionation column" include embodiments where one, two or more fractionation columns are used, unless specified to the contrary or the context clearly indicates that only one fractionation column is used.

"Asphaltenes" as used herein means heavy components in the composition, feed, or effluent in question that are insoluble in n-heptane as determined pursuant to ASTM D-3279-97.

"Asphalt product" herein means a product derived from crude refining suitable as a binder or binder component in earth surface covering materials (e.g., paving materials), building structure surface covering (e.g., shingles of roofs), or as a component in waterproof surface coating (e.g., pipe external or internal surface coating), or as a component in other uses of asphalt. Thus, an asphalt product in the meaning of this disclosure may be used as a binder, a waterproof surface coating, or the like, alone and directly, or blended, mixed, and combined with other asphalt product or other materials before being used for such intended applications. An asphalt product in this disclosure typically comprises asphaltenes, based on the total weight of the asphalt product, at least 60 wt %, preferably at least 70 wt %, more preferably at least 80 wt %, still more preferably at least 90 wt %, and still more preferably at least 95 wt %.

"Asphaltenes-rich" as used herein means the composition, feed, or effluent in question comprises asphaltenes at a total concentration thereof of at least 3 wt %, preferably at least 5 wt %, more preferably at 8 wt %, still more preferably at least 10 wt %, based on the total weight of the hydrocarbons in the composition, feed, or effluent.

"C2-C3 paraffins-rich" as used herein means the material in question such as a feed or an effluent comprises ethane and/or propane at a total concentration thereof of at least 50 mol %, based on the total moles of molecules in the material.

"Consisting essentially of" as used herein means the composition, feed, or effluent comprises a given component at a concentration of at least 60 wt %, preferably at least 70 wt %, more preferably at least 80 wt %, more preferably at least 90 wt %, still more preferably at least 95 wt %, based on the total weight of the composition, feed, or effluent in question.

"Crude," as used herein, means whole crude oil as it issues from a wellhead, production field facility, transportation facility, or other initial field processing facility, optionally including crude that has been processed by a step of desalting, treating, and/or other steps as may be necessary to render it acceptable for conventional distillation in a refinery. Crude as used herein is presumed to contain resid. Crudes from one of the following regions of the world may be used alone as an asphaltenes-rich feed to the first stripping column in the process of this disclosure: U.S. Gulf Coast, southern California, north slope of Alaska, Canada tar sands, Canadian Alberta region, Mexico Bay of Campeche, Argentinean San Jorge basin, Brazilian Santos and Campos basins, Egyptian Gulf of Suez, Chad, United Kingdom North Sea, Angola Offshore, China Bohai Bay, China Karamay, Iraq Zagros, Kazakhstan Caspian, Nigeria Offshore, Madagascar northwest, Oman, Netherlands Schoonebek, Venezuelan Zulia, Malaysia, and Indonesia Sumatra. Non-limiting examples of particularly advantageous crudes rich in asphaltenes suitable for making asphalt products include: Arab Heavy, Arab Medium, Arab Light, Heavy Western Canadian Crudes, and Iranian light. Alternatively, mixtures comprising multiple crudes, or mixtures of crude(s) with resid(s) and/or other crude fractions may be used as asphaltenes-rich feed to the first stripping column of this disclosure. Preferably, a crude or a mixture of two or more crudes is used as the asphaltenes-rich feed to the first stripping column in the process of this disclosure.

"Crude fractions" as used herein mean hydrocarbon fractions obtainable from fractionation of crude. Crude fraction useful as the asphaltenes-rich feed or a portion thereof in the process of this disclosure are typically heavy fractions, such as those obtained from the refinery pipestill. Although any crude fraction obtained from the refinery pipestill may be useful in the present invention, crude fractions still containing all or a portion of the original resid present in the whole crude obtained from the wellhead may be preferably used as a feed to the first stripping column in the process of this disclosure.

The term "hydrocarbon" means (i) any compound consisting of hydrogen and carbon atoms or (ii) any mixture of two or more such compounds in (i). The term "Cn hydrocarbon," where n is a positive integer, means (i) any hydrocarbon compound comprising carbon atom(s) in its molecule at the total number of n, or (ii) any mixture of two or more such hydrocarbon compounds in (i). Thus, a C2 hydrocarbon can be ethane, ethylene, acetylene, or mixtures of at least two of them at any proportion. A "Cm to Cn hydrocarbon" or "Cm-Cn hydrocarbon," where m and n are positive integers and m<n, means any of Cm, Cm+1, Cm+2, . . . , Cn−1, Cn hydrocarbons, or any mixtures of two or more thereof. Thus, a "C2 to C3 hydrocarbon" or "C2-C3 hydrocarbon" can be any of ethane, ethylene, acetylene, propane, propene, propyne, propadiene, cyclopropane, and any mixtures of two or more thereof at any proportion between and among the components. A "saturated C2-C3 hydrocarbon" can be ethane, propane, cyclopropane, or any mixture thereof of two or more thereof at any proportion. A "Cn+ hydrocarbon" means (i) any hydrocarbon compound comprising carbon atom(s) in its molecule at the total number of at least n, or (ii) any mixture of two or more such hydrocarbon compounds in (i). A "Cn− hydrocarbon" means (i) any hydrocarbon compound comprising carbon atoms in its molecule at the total number of at most n, or (ii) any mixture of two or more such hydrocarbon compounds in (i). A "Cm hydrocarbon stream" means a hydrocarbon stream consisting essentially of Cm hydrocarbon(s). A "Cm–Cn hydrocarbon stream" means a hydrocarbon stream consisting essentially of Cm-Cn hydrocarbon(s).

A "light hydrocarbon stream" useful as a stripping vapor stream or a portion thereof in the process of this disclosure can be advantageously a C5− hydrocarbon stream, such as a C1-C4 hydrocarbon stream, a C1-C3 hydrocarbon stream, a C1-C2 hydrocarbon stream, natural gas, methane, a C2-C4 hydrocarbon stream, a C2-C3 hydrocarbon stream, a saturated C5− hydrocarbon stream, a saturated C1-C4 hydrocarbon stream, a saturated C1-C3 hydrocarbon stream, a saturated C1-C2 hydrocarbon stream, a saturated C2-C4 hydrocarbon stream, or a saturated C2-C3 hydrocarbon stream.

In this disclosure, a location "in the vicinity of" an end (top or bottom) of a column means a location within a distance of a*Hc from the end (top or bottom) of the column, where Hc is the height of the column from the bottom to the top, and a1≤a≤a2, where a1 and a2 can be, independently, 0, 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, 0.30, 0.31, 0.32, or 0.33, as long as a1<a2. For example, a location in the vicinity of an end of a column can have an absolute distance from the end (top or bottom) of at most D meters, where D can be 5.0, 4.5, 4.0, 3.5, 3.0, 2.5, 2.0, 1.5, 1.0, 0.8, 0.5, 0.4, 0.3, 0.2, 0.1, or 0.

As used herein, "non-volatile components" are the fraction of the hydrocarbon feed with a nominal boiling point of at least 590° C. (1100° F.) as measured by ASTM D-6352-98 or D-2887. The boiling point distribution of the hydrocarbon feed is measured by Gas Chromatograph Distillation (GCD) by ASTM D-6352-98 or D-2887. Non-volatiles include coke precursors, which are large, condensable molecules that condense in the vapor and then form coke under the operating conditions encountered in the present process of the invention.

"Olefin product" means a product comprising an olefin, preferably a product consisting essentially of an olefin. An olefin product in the meaning of this disclosure can be, e.g., an ethylene stream, a propylene stream, an ethylene/propylene mixture stream, a butylene stream, and the like.

"Resid" as used herein refers to the bottoms cut of a crude distillation process that contains non-volatile components. Resids are complex mixture of heavy petroleum compounds otherwise known in the art as residuum or residual. Atmospheric resid is the bottoms product produced from atmospheric distillation of crude where a typical endpoint of the heaviest distilled product is nominally 650° F. (343° C.), and is referred to as 650° F. (343° C.) resid. The term "nominally" herein means that reasonable experts may disagree on the exact cut point for these terms, but by no more than +/−100° F. (+/−55.6° C.) preferably no more than +/−50° F. (+/−27.8° C.). Atmospheric resid can be used alone as an asphaltenes-rich feed to the first stripping column in the process of this disclosure. Alternatively and preferably, atmospheric resid may be combined with a crude, a lighter crude fraction, and/or a heavier crude fraction to form an asphaltenes-rich feed supplied to the first stripping column in the process of this disclosure. Vacuum resid is the bottoms product from a distillation column operated under vacuum where the heaviest distilled product can be nominally 1050° F. (566° C.), and is referred to as 1050° F. (566° C.) resid. This 1050° F. (566° C.) portion contains high concentration of asphaltenes, which traditionally are considered to be problematic for the steam cracker, resulting in severe fouling and potentially corrosion or erosion of the apparatus. Vacuum resid can be advantageously mixed with a crude, and/or a lighter crude fraction such as an atmospheric resid to form a suitable asphaltenes-rich feed supplied to the first stripping column of the process of this disclosure. The term "resid" as used herein means the 650° F. (343° C.) resid and 1050° F. (566° C.) resid unless otherwise specified (note that 650° F. resid comprises 1050° F. resid). A resid typically comprises asphaltenes in the range from 0.1 to 50 wt %, depending on the composition of the petroleum feed.

Resid can contain a high proportion of undesirable impurities such as metals, sulfur and nitrogen, as well as high molecular weight (C12+) naphthenic acids (measured in terms of TAN according to ASTM D-664, TAN refers to a total acid number expressed as milligrams ("mg") of KOH per gram ("g") of sample). One advantage of the process of this disclosure is that feeds high in one or more of these impurities may be readily processed in processes of this disclosure, optionally mixed with crude, or crude fractions without lower boiling points such as the atmospheric resids. In some embodiments, this disclosure can be practiced on a mixture of (i) 566° C. resid having: one or more (preferably two, three, four, five, six or seven) of the following properties: 1) 50 ppm of Ni or more, alternately 100 ppm or more, alternately 125 ppm or more, based upon the weight of the 566° C. resid; and/or 2) 200 ppm vanadium or more, alternately 500 ppm or more, alternately 900 ppm or more, based upon the weight of the 566° C. resid; and/or 3) 4 wt % sulfur or more, alternately 5 wt % or more, alternately 6 wt % or more, based upon the weight of the 566° C. resid; and/or 4) a TAN of at least 0.1, alternately at least 0.3, alternately from 0.1 to 20, 0.3 to 10, or 0.4 to 5; and/or 5) an API gravity of 19 or less (ASTM D6822, 15.5° C.); and/or 6) a C5 asphaltenes content of at least 0.04 grams of C5 asphaltenes per gram of resid ("C5 asphaltenes" refers to asphaltenes that are insoluble in pentane as determined by ASTM Method D2007); and/or 7) a kinematic viscosity at 37.8° C. of at least 10 cSt (as determined by ASTM D445), and (ii) a lighter crude fraction or a crude. Exemplary resids that can be used herein are the 566° C. resids obtained from crudes in various geographical areas described above. Additional resids useful herein include 566° C. resids obtained from crude oils described as "disadvantaged" in U.S. Pat. No. 7,678,264, incorporated by reference herein.

The term "theoretical stage," "theoretical distillation stage," "theoretical plate," "ideal equilibrium stage," and "ideal stage" are interchangeably used herein to mean a stage which has the exit phases/streams in thermodynamic equilibrium. The value of theoretical stage of a given section in a given distillation column can be determined using conventional techniques, including bottoms liquid sampling followed by any technique for measuring the bottoms boiling curve, e.g., the methods outlined in ASTM Standard D-2887.

An "upper effluent" as used herein may be at the very top or the side of a vessel such as a drum, a fractionation column or a reactor, with or without an additional effluent above it. Preferably, an upper effluent is drawn at a location in the vicinity of the top of the column. Preferably, an upper effluent is drawn at a location above at least one feed. A "lower effluent" as used herein is at a location lower than the upper effluent, which may be at the very bottom or the side of a vessel, and if at the side, with or without additional effluent below it. Preferably, a lower effluent is drawn at a location in the vicinity of the bottom of the column. Preferably, a lower effluent is drawn at a location below at least one feed. As used herein, a "middle effluent" is an effluent between an upper effluent and a lower effluent. An "overhead effluent" is an upper effluent drawn in the vicinity of the top of a vessel such as a distillation column, preferably from the top. A "bottoms effluent" is a lower effluent drawn in the vicinity of the bottom of a vessel such as a distillation column, preferably from the bottom.

As used herein, "wt %" means percentage by weight, "vol %" means percentage by volume, "mol %" means percentage by mole, "ppm" means parts per million, and "ppm wt" and "wppm" are used interchangeably to mean parts per million on a weight basis. All concentrations herein are expressed on the basis of the total amount of the composition in question. Thus, the concentrations of the various components of the "asphaltenes-rich feed" are expressed based on the total weight of the asphaltenes-rich feed. All ranges expressed herein should include both end points as two specific embodiments unless specified or indicated to the contrary.

Nomenclature of elements and groups thereof used herein are pursuant to the Periodic Table used by the International Union of Pure and Applied Chemistry after 1988. An example of the Periodic Table is shown in the inner page of the front cover of Advanced Inorganic Chemistry, $6^{th}$ Edition, by F. Albert Cotton et al. (John Wiley & Sons, Inc., 1999).

This disclosure relates to processes and systems for processing asphaltenes-rich feed suitable for making asphalt products and olefin products, and optional additional products such as hydrogen, methane, olefins, fuels, aromatics, and the like. The process and system utilizes a first stripping column where the asphaltenes-rich feed undergoes deep stripping by one or more stripping streams to obtain an overhead effluent and an asphaltenes-rich bottoms effluent. The bottoms effluent, with optional additional processing, may be used as an asphalt product. At least a portion of the overhead effluent can be fed into a pyrolysis furnace cracker to produce a cracker product mixture comprising olefins. The cracker product mixture, upon quenching, can be separated and processed in a cracked product recovery zone to obtain at least one olefin product stream and at least one optional byproduct stream. By utilizing the process and/or system of this disclosure, an asphalt product and an olefin product can be conveniently produced from an asphaltenes-rich crude without using a complicated and expensive vacuum distillation column, and with reduced propensity of fouling of the pyrolysis furnace cracker. The process and system of this disclosure can be also used to produce asphalt products from atmospheric resids, vacuum resids, mixtures thereof, and mixtures of resids with crudes and/or lighter crude fractions.

The asphaltenes-rich feed may be fed into the first stripping column via a single first inlet or multiple first inlets from a single source (e.g., a storage tank). Alternatively, multiple streams of asphaltenes-rich feeds having differing compositions from multiple sources (e.g., a crude stream, a 343° C. resid stream from an atmospheric distillation column, and a vacuum resid stream from a vacuum distillation column) may be fed into the first stripping column via a common shared first inlet or multiple, separate first inlets. In the latter case, the multiple first inlets may be situated at the same or differing heights from the bottom on the first stripping column. In the disclosure below, for the convenience of description, the "asphaltenes-rich feed" should be understood to mean the aggregate of all asphaltenes-rich feed streams supplied to the first stripping column, unless specified otherwise or the context of the description clearly indicates otherwise.

In one embodiment, the crude, crude fraction, or mixtures thereof fed to the first stripping column as the asphaltenes-rich feed(s) may comprise asphaltenes (defined earlier in this disclosure) at a total concentration thereof from c1 to c2 wt %, based on the total weight of the hydrocarbons in all asphaltenes-rich feed(s), where c1 and c2 can be, independently, 1, 2, 3, 4, 5, 6, 7, 8, 9, 10, 15, 20, 25, 30, 35, 40, 45, or even 50, as long as c1<c2. Preferably c1=3, and c2=40. More preferably C1=5 and C2=30. In another embodiment, the crude, crude fraction, or mixtures thereof fed to the first stripping column as the asphaltenes-rich feed(s) may comprise non-volatile components (defined earlier in this disclosure) at a total concentration thereof from c3 to c4 wt %, based on the total weight of the hydrocarbons in all asphaltenes-rich feed(s), where c3 and c4 can be, independently, 2, 3, 4, 5, 6, 7, 8, 9, 10, 15, 20, 25, 30, 35, 40, 45, or even 50, as long as c3<c4. Preferably c3=3, and c4=40. More preferably c3=5, and c4=30.

Such asphaltenes-rich feedstock could comprise, by way of non-limiting examples, one or more of steam cracked gas oil and residues, gas oils, heating oil, hydrocrackate, atmospheric pipestill bottoms, vacuum pipestill streams including bottoms, to gas oil condensates, heavy non-virgin hydrocarbon streams from refineries, vacuum gas oils, heavy gas oil, naphtha contaminated with crude, atmospheric residue, heavy residue, C4's/residue admixture, naphtha/residue admixture, hydrocarbon gases/residue admixtures, hydrogen/residue admixtures, gas oil/residue admixture, and crude oil.

Preferably the first inlet through which the asphaltenes-rich feed is supplied into the first stripping column is located in the vicinity of the bottom of the first stripping column to prevent heavy asphaltenes from entering into the first overhead effluent, which can cause fouling of the downstream pyrolysis furnace cracker.

The asphaltenes-rich feed can be at a temperature within a broad range when entering the first stripping column, depending on factors such as the source, composition, the concentration of resids, and the like. When entering the first stripping column, the asphaltenes-rich feed preferably has a temperature in a range from T1 to T2° C., where T1 and T2 can be, independently, 300, 320, 340, 343, 350, 360, 380, 400, 420, or 450, as long as T1<T2, especially if only crude or crude mixtures is supplied as the asphaltenes-rich feed to the first stripping column. Depending on the source of the specific asphaltenes-rich feed stream and source temperature, the feed stream may be advantageously heated or cooled to the desirable temperature by other streams supplied or generated in the same facility, particularly in the same process of this disclosure, to maximize energy efficiency, by using one or more heat exchangers. In a specific embodiment, the asphaltenes-rich feed, or a portion thereof, may be heated in a tube winding located within the furnace of a pyrolysis furnace cracker described below. In another specific embodiment, the asphaltenes-rich feed, or a portion thereof, may be heated by directly combining with a stream with a higher temperature, such as a dilute steam stream (e.g., a super-heated steam stream) or a stripping vapor stream described below.

The process of this disclosure provides for enhanced stripping of the asphaltenes-rich feed materials to produce an overhead effluent rich in lighter hydrocarbons suitable for cracking in a pyrolysis furnace cracker, and a heavy bottoms effluent rich in asphaltenes suitable for making asphalt products. The deep stripping is effected by supplying one or more first stripping vapor streams into the first stripping column via one or more second inlets. The second inlet(s) is located below the first inlet(s) for receiving the asphaltenes-rich feed stream(s), which permits the upward flowing stripping vapor to mix with the components in the asphaltenes-rich feed in the column, resulting in deep and effective stripping of components lighter than the bottoms effluent in the asphaltenes-rich feed to form the overhead effluent.

The one or more first stripping vapor stream(s) can have the same or differing compositions. Any given first stripping vapor stream can be, e.g., a hydrogen stream, a steam stream, a light hydrocarbon stream (e.g., a saturated C2-C3 hydrocarbon stream), an inert gas (e.g., nitrogen, noble gases) stream, or mixtures thereof (e.g., a hydrogen/methane mixture stream, a steam/light hydrocarbon mixture stream, a hydrogen/steam mixture stream, a hydrogen/steam/light hydrocarbon mixture stream). A single second inlet may be used for supplying one or more of hydrogen, steam, light hydrocarbons, an inert gas, or any mixture thereof, as the only first stripping vapor stream into the first striping column. Alternatively, multiple second inlets may be used for supplying identical hydrogen streams, steam streams, light hydrocarbon streams, inert gases, or identical mixture streams of hydrogen and/or steam and/or light hydrocarbon(s) and inert gases, into the first stripping column. Still alternatively, multiple second inlets may be used for supplying differing first stripping vapor streams (e.g., hydrogen stream(s), steam stream(s), light hydrocarbon stream(s), and mixtures thereof) into the first stripping column. In one embodiment, a steam stream is supplied to the first stripping column at a first location in the vicinity of the bottom of the column, and a light hydrocarbon stream is supplied to the column at a second location above the first location below the first inlet(s). A first stripping vapor stream may be combined with an asphaltenes-rich stream before being fed into the first stripping column. In one specific exemplary example, a dilute steam stream can be combined with an asphaltenes-rich stream before being supplied into the first stripping column as a mixed stream.

Where a light hydrocarbon vapor is supplied to the first stripping column either as a stand-alone first stripping vapor stream, or as a portion of a mixture with other first stripping vapor(s) such as hydrogen and/or steam, or as a portion of a mixture with an asphaltenes-rich stream, such light hydrocarbon stream preferably consists essentially of C1-05 hydrocarbons, more preferably C2-C5 hydrocarbons, still more preferably C2-C4 hydrocarbons, and still more preferably C2-C3 hydrocarbons. Such light hydrocarbon vapor preferably consists essentially of saturated C1-C5 hydrocarbons, still more preferably saturated C2-C5 hydrocarbons, still more preferably saturated C2-C4 hydrocarbons, still more preferably saturated C2-C3 hydrocarbons. Preferably, such saturated hydrocarbons are produced in the cracked products recovery zone downstream of the pyrolysis furnace cracker. Owing to their small molecules, substantial molar quantities of such light hydrocarbons can be supplied into the first stripping column even at a small weight percentage of the heavy asphaltenes-rich feed. The saturated light hydrocarbon vapor form a portion of the first overhead effluent, at least a portion of which enters the downstream pyrolysis furnace cracker, where they can be desirably readily cracked to form light olefins such as ethylene, propene, butylenes, and the like, which can be highly valuable olefin products recoverable from the cracked products recovery zone. Where a saturated light hydrocarbon stream recovered from the cracked products recovery zone is recycled to the first stripping column as a deep first stripping vapor stream or a portion thereof, the yield of olefin products can be significantly enhanced. The weight of light hydrocarbons (e.g., saturated C2-C3 hydrocarbons) introduced into the first stripping column as the first stripping vapor stream or a portion thereof can range from 0 to 30 wt %, e.g., 0.01 to 25 wt %, or 0.1 to 20 wt %, or 0.5 to 15 wt %, or 1 to 10 wt %, or 2 to 8 wt %, or 3 to 6 wt %, or 4 to 5 wt %, of the total weight of the asphaltenes-rich feed introduced into the first stripping column.

Hydrogen can be used in addition or alternatively to the light hydrocarbon stream in the first stripping vapor stream(s) supplied to the first stripping column Such hydrogen can be sourced from, e.g., the cracked products recovery zone following the pyrolysis furnace cracker in the process of this disclosure. The hydrogen fed into the first stripping column as a stripping vapor can be a high-purity hydrogen stream, or a portion of a hydrogen/light hydrocarbon mixture stream such as a hydrogen/methane mixture stream. Feeding rate of hydrogen can range from 0 to 1.5 wt %, e.g., from 0.001 to 1.5 wt %, or from 0.1 to 1.5 wt %, or from 0.2 to 0.8 wt %, of the total weight of the asphaltenes-rich feed.

Steam can be used in addition or alternatively to the light hydrocarbon stream in the first stripping vapor stream(s) supplied to the first stripping column Such steam can be sourced from a boiler, from a superheated steam source available in the facility, or from a heat exchanger where water is heated by a hot effluent in need of cooling in the same facility, e.g., a hot stream generated in the process of this disclosure, to improve energy efficiency. Feeding rate of steam into the first stripping column can range from w1 to w2 wt % of the total weight of the asphaltenes-rich feed, where w1 and w2 can be, independently, 0, 1, 2, 3, 4, 5, 6, 7, 8, 9, 10, 15, 20, 25, 30, 35, 40, 45, 50, 55, 60, 65, 70, 75, 80, as long as w1<w2. Preferably w1=10 and w2=50. More preferably w1=20 and w2=60. Still more preferably w1=30 and w2=50, especially if steam is the predominant first stripping vapor component in order to achieve deep stripping of the asphaltenes-rich feed in the first stripping column.

Where light hydrocarbon(s) and steam are both fed to the first stripping column as separate streams or mixture stream(s), the ratio of the total moles of the light hydrocarbon(s) to the total moles of steam fed into the first stripping column can range from r1 to r2, where r1 and r2 can be, independently, 0.01, 0.02, 0.03, 0.04, 0.05, 0.06, 0.07, 0.08, 0.09, 0.10, 0.20, 0.30, 0.40, 0.50, 0.60, 0.70, 0.80, 0.90, 1.0, 2.0, 3.0, 4.0, 5.0, 6.0, 7.0, 8.0, 9.0, 10, 20, 30, 40, 50, 60, 70, 80, 90, 100, as long as r1<r2.

Although it is possible that the first stripping vapor stream(s) can have a temperature lower than one or more of the asphaltenes-rich feed stream(s), the temperature of the first stripping vapor stream(s) supplied into the first stripping column is preferably not lower than the temperature of the asphaltenes-rich feed stream(s) entering the column. Preferably, the temperature of the first stripping vapor stream(s) entering the first stripping column is higher than the lowest temperature of the asphaltenes-rich feed stream(s) entering the column by deltaT ° C., where deltaT can be, independently, 0, 10, 20, 30, 40, 50, 60, 70, 80, 90, 100, 120, 140, 150, 160, 180, 200. A higher temperature stripping vapor can provide at least a portion of the heat required for vaporizing the light components contained in the asphaltenes-rich feed facilitating the formation and separation of the first overheads effluent from the column.

The pressure of the first stripping vapor stream(s) is preferably higher than atmospheric pressure when entering the first stripping column. Thus, in preferred embodiments, the absolute pressure of the first stripping vapor stream(s) when entering the first stripping column ranges from p1 to p2 kilopascal ("kPa"), where p1 and p2 can be, independently, 102, 105, 110, 120, 130, 140, 150, 160, 170, 180, 190, 200, 203, 210, 220, 230, 240, 250, 260, 270, 280, 290, 300, 304, 310, 350, 400, 405, 450, 500, 507, 600, 700, 800, 900, 1000, 1100, 1200, 1300, 1400, 1500, 1600, 1700, 1800, 1900, or 2000, as long as p1<p2. The relatively high pressure of the first stripping vapor stream entering the first stripping column can help to ensure that column operates with an overhead pressure higher than atmospheric pressure, which facilitates the delivery of the first overhead effluent to the next step and prevents undesirable air ingress into the column.

In one embodiment, the first stripping column is operated at an internal pressure (i.e., the pressure at the top of the column) from 275 to 1400 kPa (40 to 200 psia) pressure and its temperature is similar to or slightly lower than the temperature of the asphaltenes-rich stream when entering the first stripping column. For example, the pressure at which the first stripping column operates can be from 275 to 1400 kPa (40 to 200 psia) and the temperature can be from 300 to 540° C. (572 to 1000° F.). For example, the pressure of the first stripping column can be from 600 to 1100 kPa (85 to 155 psia) and the temperature can be 370 to 490° C. (700 to 920° F.). As a further example, the pressure at the top of the first stripping column can be 700 to 1000 kPa (105 to 145 psia) with a temperature of 400 to 480° C. (750 to 900° F.). In yet another example, the pressure of the first stripping column can be 700 to 760 kPa (105 to 125 psia) and the temperature can be 430 to 475° C. (810 to 890° F.).

Upon entering the first stripping column, the stripping vapor(s) travel upwards in the column, mix with asphaltenes-rich feed material(s), free a portion of the light fractions in the asphaltenes-rich feed material(s), and exit the column together with light fractions from the asphaltenes-rich feed material(s) as a portion of the first overhead effluent. The aggregate quantity of the stripping vapors supplied into first stripping column can vary widely depending on, among others, the composition of the asphaltenes-rich feed introduced into the column. For example, the aggregate feeding rate of stripping vapor(s) to the first stripping column can be from ra to rb mol %, based on the total moles of the molecules present in the first overhead effluent, where ra and rb can be, independently, 1, 2, 4 5, 8, 10, 15, 20, 25, 30, 35, 40, 45, 50, 55, or 60, as long as ra<rb. For another example, the aggregate feeding rate of the stripping vapor(s) to the first stripping column can be from rc to rd wt % into the first stripping column, based on the total weight of the asphaltenes-rich feed supplied into the column, where rc and rd can be, independently, 1, 2, 3, 4, 5, 6, 7, 8, 9, 10, 15, 20, 25, 30, 35, 40, 45, 50, 55, or 60, as long as rc<rd. Preferably rc=30 and rd=50.

To effect the separation of the asphaltenes-rich feed in the first stripping column to obtain the asphaltenes-rich first bottoms effluent and the overhead vapor effluent, internal separation structure inside the first stripping column to provide liquid-vapor contact surface is needed. Desirably, below the location of the first inlet through which the asphaltenes-rich feed is introduced into the first stripping column, a first separation structure providing at least one theoretical distillation stage of separation is installed. Preferably, the first separation structure below the first inlet provides no more than four theoretical distillation stages of separation. More preferably, the first separation structure provides from two to four theoretical stages of separation.

The separation structure provided in the first stripping column can be any conventional separation structure such as sieve tray, bubble cap tray, packing materials, and the like, and combinations thereof. Exemplary commercial separation structures are Glitsch Grid products, e.g., FLEXIGRID®-2, FLEXIGRID®-3, FLEXIGRID®-4, and FLEXIGRID®-5, available from Koch-Glitsch, Inc., Wichita, Kans., USA, and other distillation tower wide open packing can be conveniently used to construct the first separation structure.

In another embodiment of the present invention, at least a portion of the gas-liquid contact surface is provided by one or more distillation tray comprising (a) a bottom which comprises at least one passage for admitting vapor upward to the tray and (b) a weir over which liquid can spill, extending from and above the bottom. The distillation tray can be associated with a downcomer extending beneath the tray for directing liquid spilled over the weir, the downcomer typically being a downward extension of the weir. The downcomer can extend to a level at or below the liquid level in the lower portion of the first stripping column. The bottom of the distillation tray comprises a means for permitting the passage of vapor from the bottom of the boot to pass into the tray, e.g., by using perforations, bubble caps, valve tray openings, and/or jet tray openings.

Preferably, above the first inlet and inside the first stripping column, no additional separation structure is installed, and as such, the first overhead effluent can be the sole effluent drawn from the first stripping column above the first inlet. In an alternative embodiment, however, an additional, second separation structure (such as those described above in connection with the separation structure below the first inlet) is installed in the first stripping column, enabling the option of drawing a second liquid effluent from a side outlet from the first stripping column located between the first inlet and the first overhead effluent. The second liquid effluent can be desirably a vacuum gas oil fraction that can be used for motor fuel blending. Alternatively, the second liquid effluent can be fed into a cracker, such as a fluid catalytic cracker, a pyrolysis furnace cracker, and the like, where it is converted into lower hydrocarbons comprising valuable olefin products.

As a result of deep stripping in the first stripping column, the first bottoms effluent can have a high minimal boiling point. Desirably, the first bottoms effluent produced from the first stripping column has a minimal boiling point in the range from 380 to 600° C., preferably from 400 to 550° C., more preferably from 410 to 530° C., still more preferably from 427 to 510° C. Such high minimal boiling point means that the first bottoms effluent comprises components boiling in gas oil range at a low concentration. To maintain the desirable temperature of the bottoms liquid, the first stripping column may be equipped with a reboiler or heat exchanger and a recycle loop, to heat or cool the bottoms liquid.

The first bottoms effluent produced from the first stripping column is rich in asphaltenes. Desirably, it comprises asphaltenes at a concentration in the range from 5 to 50 wt %, preferably from 8 to 40 wt %, more preferably from 10 to 30 wt %, based on the total weight of the first bottoms effluent. Desirably, it comprises non-volatiles at a concentration in the range from 6 to 30 wt %, preferably from 8 to 25 wt %, more preferably from 10 to 20 wt %, based on the total weight of the first bottoms effluent.

Depending on the composition of the asphaltenes-rich feed, and on the end application of the asphalt product, the first bottoms effluent may be used directly as an asphalt product. Alternatively, the first bottoms effluent may be further enhanced by additional processing before being used as an asphalt product. Such additional processing can include one or more of adding a $H_2S$ scavenger thereto, air blowing, and adding an acid thereto. U.S. Patent Application Publication No. 2012/0329930A1 discloses various $H_2S$ scavengers useful for making asphalt products. Non-limiting examples of asphalt $H_2S$ scavengers include: inorganic or organic salts or oxides of metal elements such as Mg, Ca, Zn, Cu, Ni, Fe, Mg, and the like; alkanolamines such as ethanolamine; and dimetallic amines U.S. Pat. No. 2,450, 756A describes air-blowing processes in making asphalt. U.S. Pat. No. 4,584,023A describes adding certain acids into a bituminous material to make an asphalt product. The disclosures in these references are incorporated herein by reference in their entirety.

While it is generally preferred that the first bottoms effluent has such a high minimal boiling point described in the preceding paragraphs, it is contemplated that in an alternate embodiment, the first stripping column may be operated such that the first bottoms effluent comprises vacuum gas oil at a relatively high concentration. In such embodiments, the first bottoms effluent may be subjected to a second-stage stripping to further reduce the concentration of gas oil. To that end, the first bottoms effluent can be fed into a second stripping column and stripped by a second stripping vapor stream fed into the second stripping column to produce a second bottoms effluent rich in asphaltenes and depleted in gas oil, and a second overhead effluent comprising a vacuum gas oil and the second stripping vapor. The second stripping vapor may be the same or different from the first stripping vapor. The second stripping vapor may be chosen from any of the materials described above for the first stripping vapor stream such as steam, hydrogen, light hydrocarbons, inert gases such as nitrogen and noble gases, and mixtures and combinations thereof. Preferably the second stripping vapor stream is a steam stream, a light hydrocarbon stream such as a C2-C3 paraffins-rich stream, or a mixture stream comprising steam and light hydrocarbons. The second overhead effluent can be cooled down to obtain a mixture of a vacuum gas oil liquid and a vapor phase comprising the second stripping vapor, which can be separated to obtain a vacuum gas oil liquid effluent and a vapor stream. The vacuum gas oil liquid effluent can be used for motor fuel blending or fed into a fluid catalytic cracker, a pyrolysis furnace cracker, and the like, to produce additional olefins and lighter hydrocarbon products. The second bottoms effluent rich in asphaltenes can be used as an asphalt product with or without further enhancing treatment described above in connection with the first bottoms effluent.

The first overhead effluent produced from the first stripping column comprises a mixture of the first stripping vapor and hydrocarbons having boiling points lower than those in the first bottoms effluent. The first overhead effluent leaves the first stripping column as a vapor stream. The first overhead effluent at the second outlet of the first stripping column can have a temperature of at least 300° C., e.g., in a range from t3 to t4° C., where t3 and t4 can be, independently, 300, 325, 350, 375, 400, 425, 450, 475, 500, 525, 550, 575, 600, as long as t3<t4.

Depending on the composition of the asphaltenes-rich feed, the first overhead effluent typically comprises a gas oil fraction and hydrocarbons lighter than the vacuum gas oil fraction. In one embodiment, one can cool down the first overhead effluent upon its leaving the first stripping column via a heat exchanger to obtain a mixture of liquid and vapor, which can be separated in a separation drum to obtain a vacuum gas oil liquid stream and a residual vapor stream. The vacuum gas oil liquid stream can be used for fuel gas blending or fed to a cracker such as a fluid catalytic cracker or a pyrolysis furnace cracker to be converted into lighter hydrocarbons rich in olefins. The residual vapor stream can be optionally further heated or cooled to the desirable temperature before being fed into a downstream pyrolysis furnace cracker, where it is converted into lighter hydrocarbons rich in olefins. In another embodiment, the first overhead effluent produced from the first stripping column can be, after optional additional heating or cooling, fed into a pyrolysis furnace cracker directly without intermediate separation, where it is converted into lighter hydrocarbons rich in olefins.

In one specific embodiment, the first stripping column can take the form of a vertical flashing drum equipped with a boot similar to the flashing drums described in WO2005/113,717 A2 and U.S. Pat. No. 7,235,705 B2, the relevant contents therein are incorporated by reference in their entirety.

A pyrolysis furnace cracker is a reactor for converting hydrocarbons by subjecting the hydrocarbon molecules to high temperature where larger hydrocarbon molecules break to form smaller hydrocarbon molecules rich in unsaturated hydrocarbons and hydrogen. Pyrolysis furnace crackers include, but not are not limited to, steam crackers.

A steam cracker is a pyrolysis furnace cracker that has two main sections: a convection section and a radiant section, where hydrocarbon feedstock enters the less severe convection section of the furnace as a liquid, vapor, or liquid/vapor mixture and where the feedstock is heated and vaporized by indirect contact with hot flue gas from the radiant section and optionally by direct contact with steam to an intermediate temperature. The vaporized feedstock and steam mixture (if present) is then introduced (typically through crossover piping) into the radiant section where it is quickly heated, at pressures typically ranging from 10 to 50 psig (69 to 345 kPa), to a severe hydrocarbon cracking temperature, such as in the range of from 1450° F. (788° C.) to 1650° F. (900° C.), to provide thermal cracking of the hydrocarbon molecules in the feed stream. The resulting cracker product mixture exiting the stream cracker is typically immediately quenched to stop further reactions and then separated in a recovery zone to obtain various fractions including hydrogen/methane, C2-C3 paraffins, ethylene, propylene, C4 olefins, C5 olefins, single-ring aromatic products, fuel oil, tar, and non-aromatic SCN (steam cracked naphtha), and the like. Description of structure and operation of stream crackers can be found in, e.g., U.S. Pat. Nos. 3,365,387, 5,580, 443, 7,244,871, 7,138,047, and U.S. Patent Application Publication No. 2005/0209495 A1, the contents of which are incorporated by reference herein in their entirety.

In the process of this disclosure, one can further introduce a steam stream ("cracker bypass steam stream") into the pyrolysis furnace cracker at a location upstream of the radiant zone to further heat the materials inside the cracker tubing and/or to dilute the materials. Where steam is introduced into the first stripping column at a first quantity of Q1, and into the pyrolysis furnace cracker at a second quantity of Q2, it is preferred that the ratio Q1/(Q1+Q2) ranges from r1 to r2, wherein r1 and r2 can be, independently, 0.70, 0.75, 0.80, 0.85, 0.90, 0.95, and 1.0, as long as r1<r2. Feeding a great majority of steam to the first stripping column results in deep stripping of the asphaltenes-rich stream in the first stripping column, and thus a more effective separation of vacuum gas oil from the first bottoms effluent.

In one embodiment, the first overhead effluent taken as overhead from the first stripping column may contain, for example, 55 to 70% hydrocarbons and 30 to 45% steam. The first overhead effluent is continuously removed from the first stripping column through an overhead pipe, which optionally conveys the vapor to a centrifugal separator to remove trace amounts of entrained and/or condensed liquid. The first overhead effluent stream continuously removed from the first stripping column can be superheated in pyrolysis furnace convection section to a temperature of, for example, about 425 to about 705° C. (800 to about 1300° F.) by the flue gas from the radiant section of the furnace. The first overhead effluent is then introduced to the radiant section of the pyrolysis furnace to be cracked. The first overhead effluent stream removed from the first stripping column can optionally be mixed with a cracker bypass steam stream before being introduced into the furnace convection section.

One or more of the hydrogen, methane, C2-C3 paraffins fractions recovered from the cracker product mixture can be partially recycled to the first stripping column as a first stripping vapor stream or a portion thereof, as described above. Among these, recycling C2-C3 paraffins into the first stripping column as a stripping vapor can be particularly advantageous. The recycled C2-C3 paraffins form a part of the first overhead effluent and is subsequently fed into the pyrolysis furnace cracker, where it is cracked to form valuable olefins. Alternatively, a portion of the C2-C3 paraffins can be fed into a dedicated steam cracker where they are converted into ethylene, propylene, hydrogen, and other byproducts. Description of equipment and processes for recovering fractions in the cracker product mixture can be found in, e.g., U.S. Pat. Nos. 5,365,011A, 5,785,739A, U.S. Patent Application Publication No. 2012/0024749A1, and the like, the contents of which are incorporated herein by reference in their entirety.

Thus, in the process and system of this disclosure, by using a deep stripping column before a pyrolysis furnace cracker, one can produce asphalt products, valuable olefin products, gas oil products, and the like, from asphaltenes-rich feeds, without the use of a vacuum distillation column.

This disclosure is further illustrated by the following non-limiting examples.

EXAMPLES

In the drawings of this disclosure, identical reference numerals have similar meanings.

Figure 1:
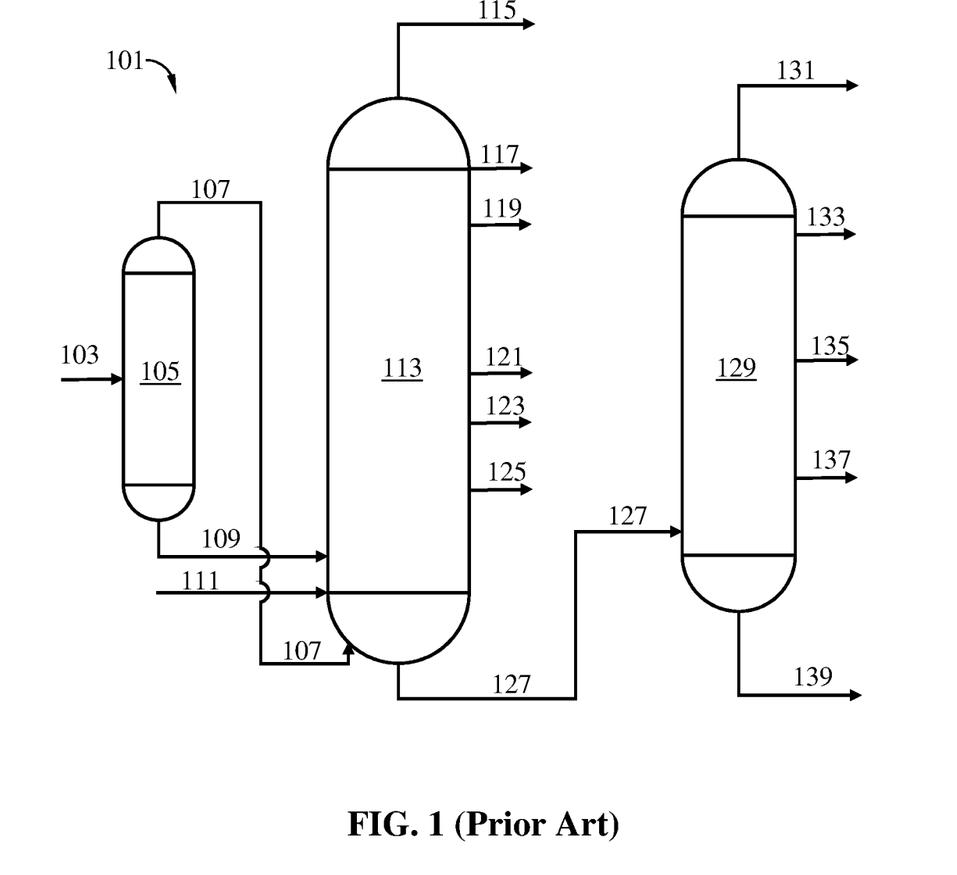
FIG. 1 is a schematic diagram showing a conventional process for processing petroleum crude oil to produce asphalt and other hydrocarbon products.

FIG. 1 schematically illustrates a process 101 in the prior art for processing a petroleum crude oil feed to make various products including asphalt. In this process, a stream of desalted crude oil feed 103 is heated and fed into a flash drum 105, where an overhead vapor effluent 107 rich in light hydrocarbons and a bottoms liquid effluent 109 rich in heavier hydrocarbons are produced. Desalting of a crude oil can be effected by injecting water into the crude oil followed by separation and removal of the aqueous phase. Stream 109 is then fed into an atmospheric crude distillation column 113 through an inlet at a first location on column 113 in proximity to the bottom of column 113. Stream 107 rich in light hydrocarbon gases is fed into column 113 through a second inlet at a second location above the bottom of column 113 but below the first location on column 113. A steam stream 111 is also fed into column 113 at a location between the first and second locations on column 113. Multiple stages of separation trays are installed inside column 113, from which, from top to bottom, an overhead effluent 115 comprising steam and fuel gas, an upper liquid effluent 117 to be pumped around for removing heat from column 113, a heavy naphtha effluent 119, a kerosene effluent 121, a diesel effluent 123, an atmospheric gas oil effluent 125, and a bottoms effluent 127 are produced. The overhead vapor effluent 115 can be further separated to remove water and to obtain a fuel gas stream rich in C5− hydrocarbons (not shown). The bottoms effluent 127 is then fed into a vacuum distillation column 129 connected to a vacuum source through line 131 and operating under a below-atmospheric pressure, from which, from the top to the bottom, a light vacuum gas oil effluent 133, a heavy vacuum gas oil effluent 135, a slop wax effluent 137, and an asphalt effluent 139 are produced. U.S. Pat. No. 4,087,354 describes substantially similar process and system to those illustrated in FIG. 1, the content of which is incorporated herein by reference in its entirety.

The process and system of FIG. 1 utilize an atmospheric distillation column and a vacuum distillation column to produce fuel gas, heavy naphtha, kerosene, diesel, light vacuum gas oil, vacuum gas oil, heavy vacuum gas oil, slop wax, and asphalt. No light olefin product, which can be highly valuable, is produced because no hydrocarbon cracker is included. The use of a vacuum distillation column is undesirable due to, among others, potential air ingress and oxidation of the hydrocarbon inside the vacuum distillation column, and high construction and maintenance costs of the vacuum distillation column, vacuum heater and the vacuum system generating the vacuum.

Figure 2:
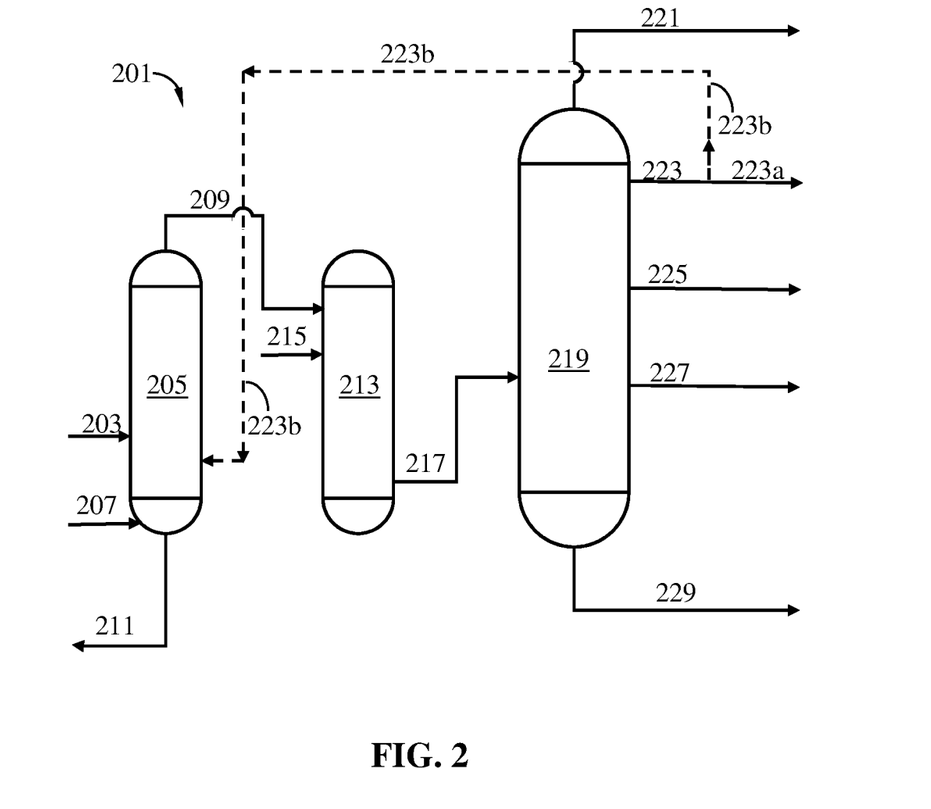
FIGS. 2, 3, 4, and 5 are schematic diagrams showing various processes of this disclosure for processing an asphaltenes-rich feed such as a crude to produce an asphalt product and other hydrocarbon products.

FIG. 2 schematically illustrates a process and system 201 of this disclosure for processing an asphaltenes-rich feed such as a crude oil feed 203 rich in asphaltenes suitable for making asphalt products. The asphaltenes-rich feed can be derived from crude oils known to comprising high concentrations of asphaltenes, e.g., Arab Heavy, Arab Medium, Arab Light, Heavy Western Canadian Crudes, Iranian light and heavy and other suitable crudes for asphalt production. The asphaltenes-rich feed may preferably comprise a desalted crude oil. Desalting crude oil can be effected by injecting water into a stream of the crude oil, followed by separating the aqueous phase rich in salt and the oil phase depleted in salt. The oil phase can then be used as the asphaltenes-rich feed. U.S. Pat. No. 4,087,354 describes processes and equipment for desalting crude oil, the relevant portion thereof is incorporated herein by reference. Additionally or alternatively, the asphaltenes-rich feed 203 can also comprise high-boiling-point fractions obtained from a crude oil flashing drum, crude oil distillation columns (e.g., an atmospheric pressure crude column, or a vacuum distillation column), or from the recovery zone following a fluid catalyst cracker or a pyrolysis furnace cracker, and mixtures thereof. Depending on the source, the asphaltenes-rich feed 203 may be heated or cooled to a suitable temperature range by, e.g., a heat exchanger. Where the asphaltenes-rich feed 203 consists essentially of a desalted crude oil that has not been subjected to distillation or cracking, the temperature of the asphaltenes-rich feed entering the first stripping column can range from, e.g., 250 to 500° C., preferably from 300 to 450° C., more preferably from 350 to 400° C.

Stream 203, preferably a desalted asphaltenes-rich feed, is fed into a first stripping column 205 through a first inlet. The first inlet is preferably closer to the bottom than to the top of column 205. The first stripping column can include a reboiler (now shown) at the bottom to maintain a desirable temperature of the liquid at the bottom of column 205, which can vary broadly depending on the composition of the asphaltenes-rich feed. Where the asphaltenes-rich feed consists essentially of a desalted crude oil that has not been subjected to distillation or cracking, the liquid at the bottom of column 205 preferably has a temperature in the range from 400 to 600° C., more preferably from 427 to 510° C.

As shown in FIG. 2, a first stripping vapor stream 207 consisting of a first stripping vapor is fed into column 205 through a second inlet in the vicinity of the bottom of the column 205, below the first inlet, for stripping materials in stream 203 fed into the column. The first stripping vapor travels upwards inside column 205, contacts and mixes with the materials from stream 203 to form mixtures distributed inside the column. At a given internal total pressure inside the column 205, the higher the partial pressure of the first stripping vapor, the lower the partial pressure of the oil components (e.g., hydrocarbons) originating from the asphaltenes-rich feed stream 203. The lower partial pressure of the oil components requires lower temperature at the bottom of column 205, enabling separation and stripping of the oil components under a less severe condition. Feeding a substantial quantity of the first stripping vapor into the first stripping column can greatly facilitate the separation of vacuum gas oil components in the asphaltenes-rich feed 203 from asphaltenes-rich bottoms effluent without having to heat the liquid at the bottom of column 205 to an otherwise exceedingly high temperature if no stripping vapor steam is used.

In a preferred embodiment, the first stripping vapor stream comprises steam at any concentration from 0 to 100 mol % based on the total quantity of the first stripping vapor stream, such as at 0, 5, 10, 20, 30, 40, 50, 60, 70, 80, 90, or 100 mol %. The steam in the first stripping vapor stream can be supplied from, e.g., a boiler, a superheated steam source, or a heat exchanger where water is heated by a hot stream in need of cooling.

The first stripping vapor stream 207 can also comprise, in addition or alternative to steam, hydrogen, hydrocarbon components such as light C1-C5 hydrocarbons, preferably C2-C5 hydrocarbons, more preferably C2-C4 hydrocarbons, still more preferably C2-C3 hydrocarbons. While unsaturated hydrocarbons may be present in the first stripping vapor stream, it is preferred that that hydrocarbon components are rich in saturated light hydrocarbons such as C2-C5 paraffins, preferably C2-C4 paraffins, more preferably C2-C3 paraffins. By "rich in saturated light hydrocarbons," it is intended to mean that the hydrocarbon components comprise saturated light hydrocarbons at a total concentration thereof of at least 60 mol %, based on the total moles of hydrocarbons in the hydrocarbon components. The hydrocarbon components in the first stripping vapor stream can be sourced from, e.g., the recovery zone for recovering products from the effluent of a pyrolysis furnace cracker described below.

To effect deep stripping of the materials in the asphaltenes-rich feed stream 203, it is highly desirable that a significant quantity of the first stripping vapor (e.g., steam) is introduced into the first stripping column 205.

To separate the materials in the asphaltenes-rich feed stream 203 to a certain degree to obtain at least the first bottoms effluent 211, a liquid stream, and the first overhead effluent, a vapor stream, it is highly desirable that a structure providing a vapor-liquid contact surface facilitating separation is installed between the first and second inlets such that at least one theoretical stage of separation tray is present between the first and second inlets. Such structure can include any conventional separation tray such as sieve tray, bubble cap tray, packing materials, and the like, and combinations thereof. Preferably, at most four (4) theoretical stages of separation trays is present between the first and second inlets. More preferably, from two (2) to four (4) theoretical stages of separation trays are present between the first and second inlets. In one preferred embodiment, above the first inlet inside the first stripping column, no separation tray is present.

From the bottom of column 205, a first bottoms effluent 211 (a liquid mixture) rich in asphaltenes suitable for making asphalt products is obtained. The materials in the first bottoms effluent may be used directly as an asphalt product, depending on the composition of the asphaltenes-rich feed 203 and the intended application of the asphalt product. In certain embodiments, the materials in stream 211 can be further processed before being used as an asphalt product. Such further processing can include one or more of adding a $H_2S$ scavenger (e.g., ZnO, CuO, MgO, ethanolamine, and the like), air blowing, and adding an acid thereto, to enhance the quality of the material as an asphalt product.

From the top of column 205, a first overhead effluent 209 (a vapor mixture) comprising the first stripping vapor (e.g. steam) and hydrocarbons having boiling points lower than the bottoms effluent is obtained.

After optional heating or cooling (not shown in FIG. 2), stream 209 is then fed into a pyrolysis furnace cracker 213, in which hydrocarbons are cracked by pyrolysis at an elevated temperature. An exemplary pyrolysis furnace cracker is a steam cracker described in U.S. Pat. No. 8,684,384, the relevant portions thereof are incorporated herein by reference. A pyrolysis furnace cracker typically comprises an upstream convection zone in which the hydrocarbons fed therein is first heated to an intermediate temperature, and a downstream radiant zone in which the hydrocarbons are exposed to a high temperature for a short residence time where pyrolysis cracking of the hydrocarbons occurs. In the embodiment illustrated in FIG. 2, an optional additional steam stream ("cracker bypass steam stream") 215 is also fed into cracker 213. Desirably the cracker bypass steam stream 215 introduces less steam into the pyrolysis furnace cracker 213 than the first stripping vapor stream does to the first stripping column. Thus, suppose the first stripping vapor stream introduces steam into the first stripping column such that the first overhead effluent comprises steam at a first quantity of Q1, and the cracker bypass steam stream introduces steam into the pyrolysis furnace cracker at a second quantity Q2, then desirably the ratio r=Q1/(Q1+Q2) can be in the range from r1 to r2, where r1 and r2 can be, independently, 0.70, 0.75, 0.80, 0.85, 0.90, 0.95, and even 1.0, as long as r1<r2. Introducing a great majority of steam into the first stripping column has the advantage of achieving deep stripping of the asphaltenes-rich feed, resulting in a desirable cutpoint in the first stripping column without operating the column at sub-atmospheric pressure.

From the cracker 213, a cracker product mixture effluent 217 is obtained, which is then quenched and fed into a cracked product recovery zone 219, from which various product streams, such as an overhead stream 221 rich in hydrogen and methane, a stream 223 rich in C2-C3 paraffin, at least one olefin product stream 225, at least one cracker byproduct stream 227, and a naphtha stream 229, can be produced.

As illustrated in FIG. 2, stream 223 rich in C2-C3 paraffin can be split into a product stream 223a and a recycle stream 223b. Stream 223a can be fed to another pyrolysis furnace cracker (not shown) to make additional olefins and hydrogen. Stream 223b (in dotted line) can be optionally recycled back to the first stripping column, either through a third inlet located between the first inlet for feed stream 203 (as shown) and the second inlet for the first stripping vapor stream 207, or through the second inlet by premixing with the first stripping vapor stream 207 (not shown).

Thus, the process and system of FIG. 2 can be operated to produce asphalt products, olefin products, and other valuable products from asphaltenes-rich feed without using a vacuum distillation column. Because the first overhead effluent produced from the first stripping column is free of asphaltenes that tend to cause fouling of a pyrolysis furnace cracker, the pyrolysis furnace cracker 213 can run with lower propensity to fouling as well.

Figure 3:
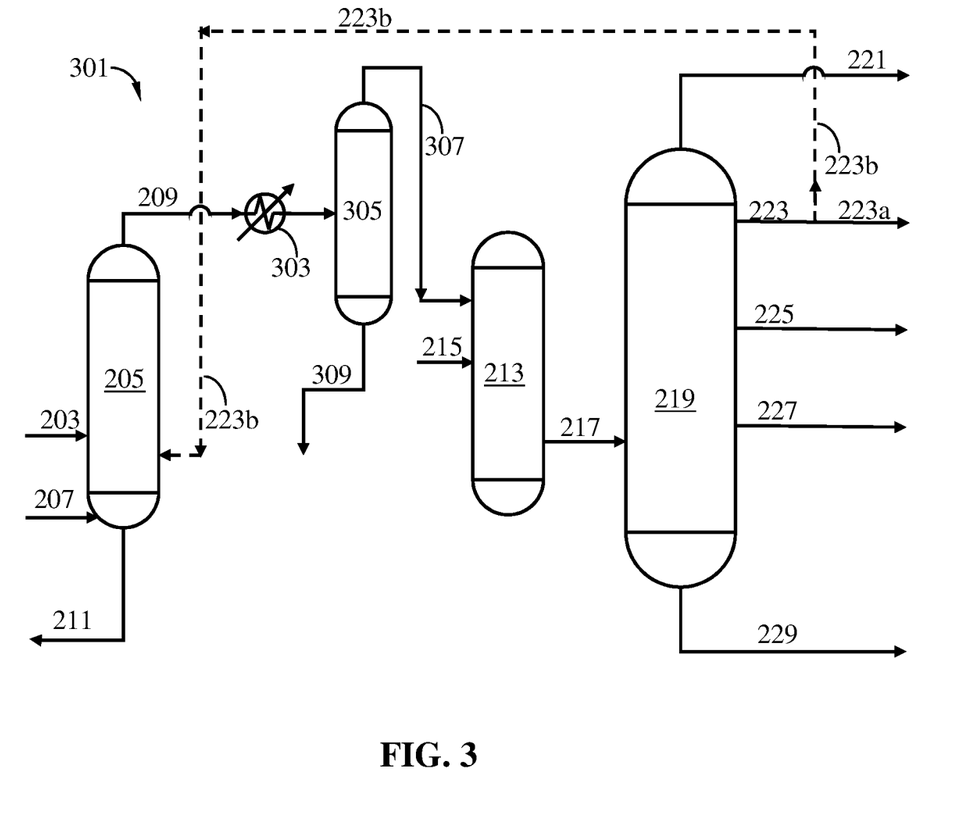

FIG. 3 schematically illustrates a variation of the process and system illustrated in FIG. 2. Thus, in the embodiment of FIG. 3, the first overhead effluent 209 produced from the first stripping column 205 is first cooled by a heat exchanger 303 to obtain a mixture of liquid and vapor, which is then fed into a separation drum 305, where a bottoms liquid effluent 309 in vacuum gas oil boiling range, and an overhead vapor effluent 307 comprising hydrocarbons lighter than those in the bottoms liquid effluent 309, are obtained. Effluent 309 can be used for motor fuel blending or fed to a fluid catalytic cracker to be converted into lower hydrocarbons including olefins. The vapor effluent 307 is then fed into a pyrolysis furnace cracker where it is converted to olefins and lighter hydrocarbons.

Figure 4:
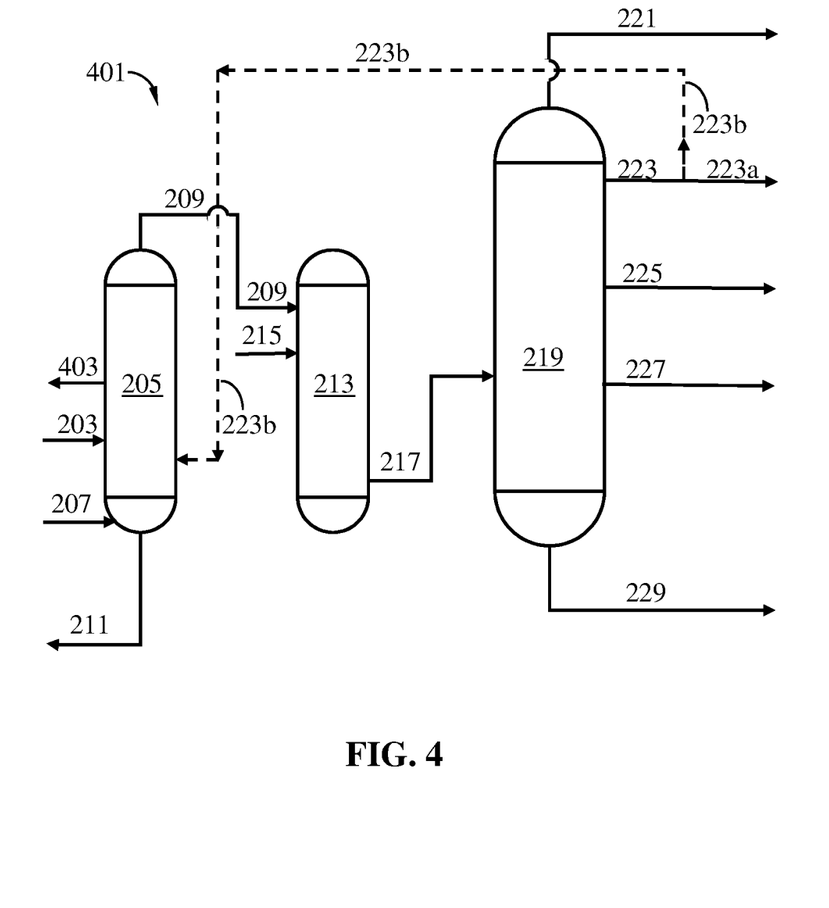

FIG. 4 schematically illustrates another variation of the process and system illustrated in FIG. 2. In this embodiment, above the first inlet receiving the asphaltenes-rich feed, an upper, second separation structure is installed inside the first stripping column 205 to further separate the materials inside the first stripping column above the first inlet. As a result, a vacuum gas oil stream 403 can be withdrawn from an outlet located on the side on the first stripping column 205. Stream 403 can be used for motor fuel blending or fed to a fluid catalytic cracker to produce lower hydrocarbons including olefins.

Figure 5:
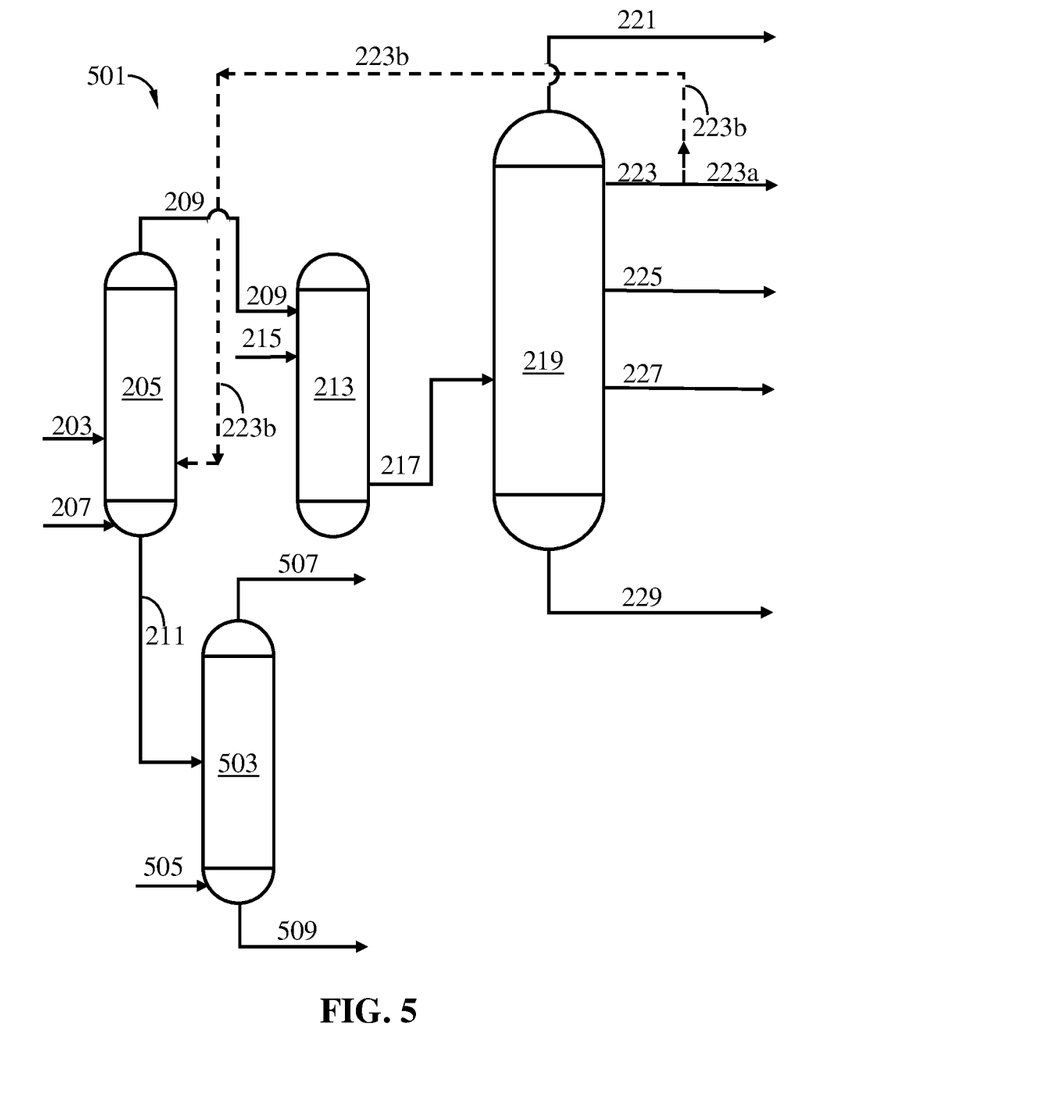

FIG. 5 schematically illustrates another variation of the process and system illustrated in FIG. 2. In this embodiment, the first bottoms effluent from the first stripping column rich in asphaltenes is fed into a second stripping column 503 to which a second stripping vapor stream 505 is fed preferably at a location in the vicinity of the bottom of column 503, where it is further separated into an overhead vapor effluent 507 comprising the second stripping vapor and a vacuum gas oil fraction, and a bottoms effluent 509 which is rich in asphaltenes. A separation structure may be installed in the second-stage stripping column as well to facilitate separation of the vapor overheads effluent and the bottoms liquid effluent. The second stripping vapor can be the same as or different from the first stripping vapor stream described above. Likewise, effluent 507 can be condensed to obtain a liquid phase vacuum gas oil fraction and a vapor phase fraction comprising the second stripping vapor. The vacuum gas oil fraction can be used for motor fuel blending or fed into a fluid catalytic cracker to produce lower hydrocarbons including olefins. Compared to the embodiment of FIG. 2, this two-stage stripping shown in FIG. 5 permits a lower cutpoint in the first stripping column and can use less quantity of the first stripping vapor fed into the first stripping column 205. Deep stripping in the second stripping column 503 results in a high cutpoint and a bottoms effluent 509 particularly rich in asphaltenes suitable for asphalt products.

What is claimed is:

1. A process for producing an asphalt product and an olefin product from an asphaltenes-rich feed, the process comprising:
   (I) feeding the asphaltenes-rich feed to a first stripping column through a first inlet on the first stripping column;
   (II) feeding a first stripping vapor stream to the first stripping column through a second inlet on the first stripping column, the second inlet being located below the first inlet;
   (III) obtaining a first overhead effluent from the first stripping column;
   (IV) feeding at least a portion of the first overhead effluent to a pyrolysis furnace cracker operating under pyrolysis cracking conditions;
   (V) obtaining a cracker product mixture effluent from the pyrolysis furnace cracker;
   (VI) obtaining the olefin product from the cracker product mixture effluent in a cracked product recovery zone, wherein this step includes obtaining a C2-C3 paraffins-rich stream;
   (VII) recycling at least a portion of the C2-C3 paraffins-rich stream to the first stripping column, wherein the C2-C3 paraffins-rich stream is fed into the first stripping column through a third inlet on the first stripping column that is located below the first inlet and above the second inlet;
   (VIII) obtaining a first bottoms effluent from the first stripping column rich in asphaltenes by stripping the asphaltenes-rich feed using the C2-C3 paraffins-rich stream and the first stripping vapor stream; and
   (IX) obtaining the asphalt product from the first bottoms effluent, wherein (IX) comprises:
      (IX.a) feeding at least a portion of the first bottoms effluent to a second stripping column through a feed inlet;
      (IX.b) feeding a second stripping vapor stream into the second stripping column through a stripping vapor inlet below the feed inlet;
      (IX.c) obtaining a second overhead effluent at a top portion of the second stripping column and a second bottoms effluent at a bottom portion of the second stripping column from the second stripping column; and
      (IX.d) obtaining the asphalt product from the second bottoms effluent.

2. The process of claim 1, wherein inside the first stripping column and between the first inlet and the second inlet, a separation structure providing at least one theoretical stage of separation is installed.

3. The process of claim 2, wherein the separation structure provides two to four theoretical stages of separation.

4. The process of claim 1, wherein the first stripping vapor stream comprises steam.

5. The process of claim 1, wherein the first overhead effluent comprises C2-C3 paraffins at a concentration in a range from 0.1 mol % to 30 mol %, based on the total moles of molecules in the first overhead effluent.

6. The process of claim 1, wherein the asphaltenes-rich feed comprises asphaltenes at a total concentration thereof in a range from 3 to 40 wt %, based on the total weight of the hydrocarbons in the asphaltenes-rich feed.

7. The process of claim 1, wherein the pyrolysis furnace cracker is a steam cracker comprising a convection zone and a radiant zone downstream of the convection zone, and the process further comprises:
feeding additional steam into the steam cracker at a location upstream of the radiant zone.

8. The process of claim 7, wherein the first overhead effluent comprises steam at a first quantity of Q1, the additional steam fed into the steam cracker has a second quantity of Q2, and $Q1/(Q1+Q2) \geq 0.70$.

9. The process of claim 7, wherein the additional steam is fed into an additional steam inlet, the portion of the first overhead effluent is fed into the pyrolysis furnace cracker at an effluent inlet, and the additional steam inlet is positioned below the effluent inlet.

10. The process of claim 1, wherein;
a top of the first stripping column is operated at an absolute pressure in the range from 101 to 2000 kPa,
the asphaltenes-rich feed has a temperature in the range from 300 to 450° C. at the first inlet when fed into the first stripping column, and
a cutpoint of the first bottoms effluent is in the range from 427 to 510° C.

11. The process of claim 1, wherein (IX) further comprises:
treating at least a portion of the second bottoms effluent by at least one of adding a $H_2S$ scavenger thereto, air blowing, and adding an acid thereto, to obtain the asphalt product.

12. The process of claim 1, further comprising:
cooling at least a portion of the first overhead effluent to obtain a liquid/vapor mixture; and
obtaining a light vacuum gas oil liquid stream from the liquid/vapor mixture.

13. The process of claim 1, further comprising:
providing a separation structure in the first stripping column above the first inlet; and
obtaining a liquid vacuum gas oil side stream from the first stripping column at a location above the first inlet but below the first overhead effluent and in proximity to the separation structure.

14. The process of claim 1, wherein the first stripping column has a constant inner diameter from a first end to a second end thereof.

15. The process of claim 1, wherein an inner diameter of the first stripping column the first inlet is located at and an inner diameter of the first stripping column the third inlet is located at are the same.

16. A system for processing an asphaltenes-rich feed to produce an asphalt product and an olefin product, comprising:
a first stripping column comprising a first inlet for receiving the asphaltenes-rich feed, a second inlet located below the first inlet for receiving a first stripping vapor stream, a third inlet located between the first inlet and the second inlet for receiving at least a portion of a C2-C3 paraffins-rich stream, a first outlet at a bottom portion of the first stripping column for discharging a first bottoms effluent rich in asphaltenes, and a second outlet at a top portion of the first stripping column for discharging a first overhead effluent comprising a first stripping vapor and hydrocarbons;
a second stripping column in fluid communication with the first stripping column adapted for receiving at least a portion of the first bottoms effluent and a second stripping steam stream, and discharging a second overhead effluent comprising a vacuum gas oil and a second bottoms effluent rich in asphaltenes suitable for making asphalt products;
a pyrolysis furnace cracker in fluid communication with the first stripping column for receiving at least a portion of the first overhead effluent from the first stripping column, capable of operating under pyrolysis cracking conditions to convert at least a portion of the hydrocarbons in the first overhead effluent into lighter hydrocarbons to produce a cracker product mixture effluent;
a cracked product recovery subsystem in fluid communication with the pyrolysis furnace cracker for receiving the cracker product mixture effluent capable of separating the cracker product mixture effluent to produce the olefin product, wherein the cracked product recovery subsystem is configured to provide the C2-C3 paraffins-rich stream; and
a recycle line configured to recycle at least a portion of the C2-C3 paraffins-rich stream to the first stripping column via the third inlet, wherein the C2-C3 paraffins-rich stream and the first stripping vapor stream are configured to strip the asphaltenes-rich feed in the first stripping column.

17. The system of claim 16, wherein inside the first stripping column and between the first inlet and the second inlet, a separation structure providing at least one theoretical stage of separation is installed.

18. The system of claim 16, wherein the pyrolysis furnace cracker is a steam cracker comprising a convection zone and a radiant zone downstream of the convection zone, and the pyrolysis furnace cracker comprises a cracker steam inlet upstream of the radiant zone for receiving a cracker bypass steam stream into the pyrolysis furnace cracker.

19. The system of claim 16, wherein:
the first stripping column comprises a separation device above the first inlet, and
a second outlet above the first inlet and below the first outlet adapted for discharging a second upper liquid effluent comprising a vacuum gas oil.

20. A process for producing an asphalt product and an olefin product from an asphaltenes-rich feed, the process comprising:
(I) feeding the asphaltenes-rich feed to a first stripping column through a first inlet on the first stripping column;
(II) feeding a first stripping vapor stream to the first stripping column through a second inlet on the first stripping column, the second inlet being located below the first inlet;

(III) obtaining a first overhead effluent from the first stripping column;

(IV) feeding at least a portion of the first overhead effluent to a pyrolysis furnace cracker operating under pyrolysis cracking conditions;

(V) obtaining a cracker product mixture effluent from the pyrolysis furnace cracker;

(VI) obtaining the olefin product from the cracker product mixture effluent in a cracked product recovery zone, wherein this step includes obtaining a C2-C3 paraffins-rich stream;

(VII) recycling at least a portion of the C2-C3 paraffins-rich stream to the first stripping column, wherein the C2-C3 paraffins-rich stream is fed into the first stripping column through a third inlet on the first stripping column that is located below the first inlet and above the second inlet;

(VIII) obtaining a first bottoms effluent from the first stripping column rich in asphaltenes by stripping the asphaltenes-rich feed using the C2-C3 paraffins-rich stream and the first stripping vapor stream; and (IX) obtaining the asphalt product from the first bottoms effluent, wherein (IX) comprises:

(IX.a) feeding at least a portion of the first bottoms effluent to a second stripping column through a feed inlet;

(IX.b) feeding a second stripping vapor stream into the second stripping column through a stripping vapor inlet below the feed inlet;

(IX.c) obtaining a second overhead effluent at a top portion of the second stripping column and a second bottoms effluent at a bottom portion of the second stripping column from the second stripping column;

(IX.d) condensing at least a portion of the second overhead effluent to obtain a liquid/vapor mixture;

(IX.e) obtaining a liquid gas oil stream from the liquid/vapor mixture; and (IX.f) obtaining the asphalt product from the second bottoms effluent.

21. The process of claim 20, wherein an amount of the C2-C3 paraffins-rich stream recycled to the first stripping column is up to 30 wt %, of the total weight of the asphaltenes-rich feed introduced into the first stripping column in step (I).

22. The process of claim 20, further comprising feeding the liquid gas oil stream to a fluid catalytic cracker to produce olefins.

23. The process of claim 20, wherein inside the first stripping column above the first inlet a separation structure is installed, the process further comprising obtaining a liquid vacuum gas oil side stream from the first stripping column at a location above the first inlet but below the first overhead effluent and in proximity to the separation structure.

24. The process of claim 20, wherein the first stripping column has a constant diameter from a first end to a second end thereof.

* * * * *